E. PHILLIANS.
BOILER CHECK OR CHECK VALVE.
APPLICATION FILED MAY 31, 1910.

999,861.

Patented Aug. 8, 1911.

WITNESSES:
O. B. Emerson
J. W. Metcalf

Edward Phillians INVENTOR

UNITED STATES PATENT OFFICE.

EDWARD PHILLIANS, OF SCOFIELD, UTAH, ASSIGNOR OF ONE-FOURTH TO O. B. EMERSON, OF SCOFIELD, UTAH.

BOILER CHECK OR CHECK-VALVE.

999,861.  Specification of Letters Patent.  Patented Aug. 8, 1911.

Application filed May 31, 1910.  Serial No. 564,338.

*To all whom it may concern:*

Be it known that I, EDWARD PHILLIANS, a citizen of the United States, residing at Scofield, in the county of Carbon and State of Utah, have invented a new and useful Improvement on Boiler Checks or Check-Valves, of which the following is a specification.

This invention is an improved check valve for use in connection with a boiler or with any form of tank, reservoir or other vessel, into which fluid is forced under pressure, the function of the valve being to close against back pressure and prevent the escape of fluid from the boiler or other vessel, the object of the invention being to provide an improved form of valve of this character with means whereby the valve or check element may be revolved on its seat while under pressure so as to grind it to the seat and enable any foreign substance which may get between the valve and its seat to be disposed of so that the valve may be enabled under any condition to close tightly against its seat, and prevent the loss of fluid by back pressure, the invention consisting in the construction, combination and arrangement of devices hereinafter described and claimed.

Figure 2:
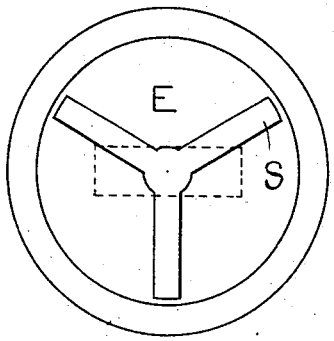
Figure 3:
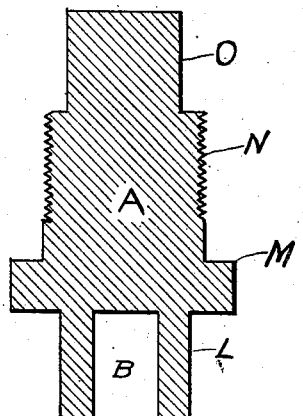
Figure 1:
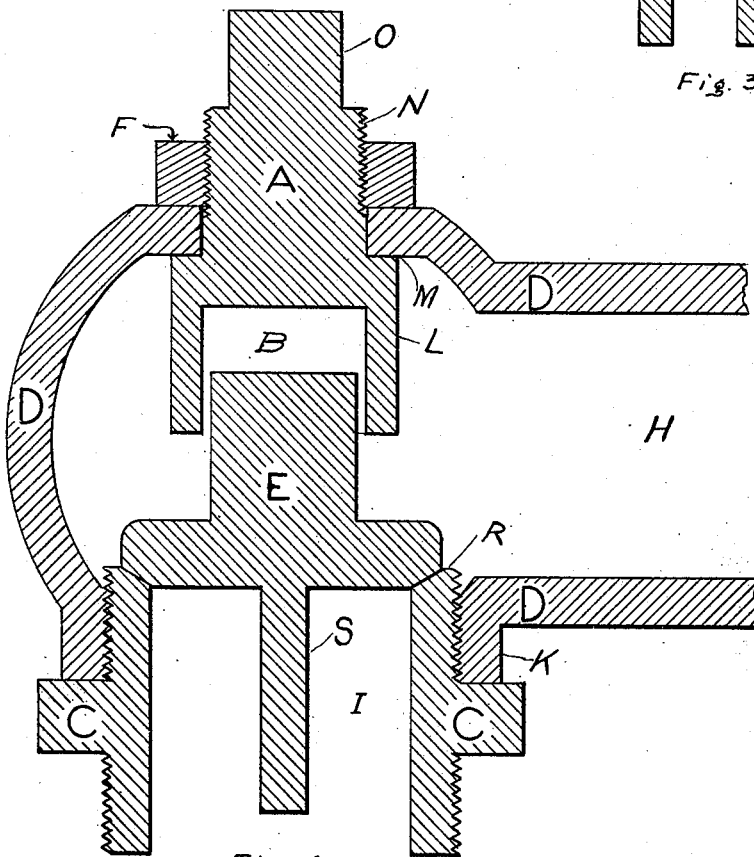

In the accompanying drawings—Figure 1 is a vertical longitudinal central sectional view of a check valve constructed in accordance with my invention. Fig. 2 is a detail inverted plan of the valve or check member. Fig. 3 is a detail sectional view of the seat plug on a plane at right angles to Fig. 1.

In the embodiment of my invention, here shown, the casing of the valve is globular in form as at D, and has an arm H leading therefrom, and an annulus K on one side, and providing an inlet opening. The said annulus is internally screw threaded. In the side of the casing, opposite and in line centrally with the annulus K, is an unthreaded opening through which extends the unthreaded cylindrical portion of a seating plug A, the inner end of which has a head L providing a shoulder M which bears against the inner side of the casing, the said head being further provided with a recess B, the length of which is greater than its width. The plug A has a threaded portion N, and its outer extremity has a cross sectionally polygonal stud O adapted to be grasped by a wrench, and to enable the plug A to be turned. A nut F is screwed on the threaded portion of the plug A and bears on the outer side of the valve casing B as shown.

In the threaded annulus K is screwed the inner end of a combined seat and coupling sleeve I which is tubular in form and is provided on its outer side with a medially disposed flange C which in practice is polygonal in form or otherwise suitably shaped to enable it to be grasped and turned by a spanner or other suitable implement. At the inner end of the sleeve I, is an inverted frusto-conical seat R. The valve or check element E has a frusto-conical face adapted to engage the seat R, so that the valve or check element is seated in the inner end of the sleeve I. The valve or check element has radial wings S on its outer side forming guides for engagement with the sleeve I to preserve the alinement of said valve or check element, and the said valve or check element is provided on its inner side with a stud E, of a size and shape adapting it to be fitted loosely in the recess B of the plug A, so that when the plug A is turned the said valve or check element is turned therewith, the recess B and the stud E constituting a loose coupling between the said plug and the said check valve or check element.

The arm H of the casing is connected to the boiler, tank, reservoir or other vessel, in connection with which the valve is used, and the supply pipe is connected to the threaded outer portion of the sleeve I. It will be understood that when fluid is forced into the boiler or other vessel under pressure through the sleeve I, the valve or check element is unseated and allows the fluid to pass. The said valve or check element closes, however, against back pressure as will be understood. In the event of any leakage between the valve or check element and the valve seat, the said valve or check element may be turned while under pressure by means of the plug A and the loose coupling between the said plug and the said valve or check element, and hence the latter may be reground into and against the seat at any time. In the event that any foreign substance should lodge between the valve or check element and the seat, said foreign substance may be dislodged or reduced to a powdered condition, by turning the valve or check element in the manner above described, so that under any and all conditions, the valve or check element may be kept ground and accurately fitted in its seat, while the valve is under pressure. The exterior diameter of the sleeve I which is screwed in the annulus K of the valve casing is greater than that of the valve or check element E and also exceeds any dimension of the head L of the plug A and hence the valve or check element and the said plug are enabled to pass through the annulus or inlet opening of the valve casing when assembling or disassembling the parts of the valve. The nut F holds the plug A in position while the valve is not under pressure.

I claim:—

The herein described valve comprising a globular casing, flattened on one side, provided on the opposite side with a threaded inlet opening, and further provided with a discharge opening between said inlet opening and said flattened side of the valve casing, the said flattened side of the valve casing having an unthreaded opening concentric with and smaller than the said inlet opening; a sleeve screwed in and removable from the threaded inlet opening, said sleeve constituting the inlet duct of the valve casing, and being provided at its inner end with a seat, a check element in the valve casing, shaped on one side to fit in the said sleeve, the said check element being further provided with guides operating in the said sleeve and being provided on its inner side with a cross sectionally angular stud, a plug inserted in the casing, through the inlet opening and having an unthreaded cylindrical portion revoluble in the unthreaded opening of the casing, being further provided with a head disposed within the casing and presenting a shoulder which bears against the inner surface of the flattened side of the casing, the head of the said plug being further provided with a cross sectionally angular recess in which the inner end of the stud of the check element is disposed, said plug having a threaded portion exterior of the valve casing, and a nut screwed on said threaded portion, bearing against the outer surface of the flattened side of the valve casing, and revoluble with said plug, to cause the said check element to be turned in its seat, the diameter of the inlet opening of the casing, and the exterior diameter of the said sleeve exceeding the diameter of the check element, and also exceeding any dimension of the head of the said plug.

EDWARD PHILLIANS.

Witnesses:
J. F. BAIRD,
G. D. WOOD.

---

Copies of this patent may be obtained for five cents each, by addressing the "Commissioner of Patents, Washington, D. C."